Aug. 2, 1960  DENIS C. YANG  2,947,168
POWER INDICATOR
Filed June 23, 1954  3 Sheets-Sheet 1

INVENTOR.
DENIS C. YANG
BY Sidney W. Frick
ATTORNEY

Aug. 2, 1960

DENIS C. YANG 2,947,168

POWER INDICATOR

Filed June 23, 1954

INVENTOR.
DENIS C. YANG
BY
Sidney W. Frick
ATTORNEY

United States Patent Office 2,947,168
Patented Aug. 2, 1960

2,947,168
POWER INDICATOR
Denis C. Yang, 509 10th Ave., Prospect Park, Pa.

Filed June 23, 1954, Ser. No. 438,809

5 Claims. (Cl. 73—136)

This invention relates to instruments for the measurement of power, and more particularly to apparatus directly applicable to a rotating shaft connecting a power source with its load whereby the power transmitted by the shaft can be read directly and continuously without the necessity of calculation or interpolation.

Measurement of mechanical power transmitted by a rotating shaft is based upon its fundamental relationship with shaft speed and torque, which may be expressed: $P = K \times N \times T$, where P is power, K is a constant, N is the rate of shaft rotation, and T is the torque applied to the shaft. Heretofore, utilization of this principle for the measurement of power either has involved use of rather complex equipment to accomplish independent measurements of rate of shaft rotation and shaft twist, which is proportional to torque, followed by the indicated mathematical calculation to determine power, or has involved other relatively elaborate, cumbersome and expensive apparatus and associated circuits to achieve direct power reading results.

A primary objective of the present invention is to provide a simplified apparatus which will give a direct and continuous reading of mechanical power transmitted by a rotating member, which is readily applicable to such rotating member without the necessity of any modification or disturbance to the rotating member or to the system in which it is used, such as the addition of a resilient coupling, or strain gages and associated instrumentation, or the like, and which, at the same time, eliminates the need for elaborate and expensive multipole generator systems having cumbersome magnet and winding arrangements. One of its great advantages is its flexibility and the ease with which it can be adapted for and applied to many types of power transmission systems, having rotating members of varying sizes and structures, and having a wide range of operating speeds and power outputs.

Other objectives of the present invention are the inclusion, if desired, of means for the reading of the rate of shaft rotation in addition to power, and of means for the measurement of torque without the necessity of calculation, and the provision, in a further modification, of greatly simplified means giving a direct and continuous reading of torque.

Another important objective of this invention is the provision of a simplified apparatus responsive generally to one or more of the characteristics of a rotating member, either individually or in desired combination, and which can be readily adapted to apply the response to a wide variety of indicating, measuring, or recording instruments, or to other types of devices, equipment, or circuits for the accomplishment of other specific purposes.

How the foregoing objectives, advantages and features are attained, as well as others that will be made apparent hereinafter, will appear more fully in the following detailed description, as aided by reference to the accompanying drawings and diagrams, in which.

Figure 1:
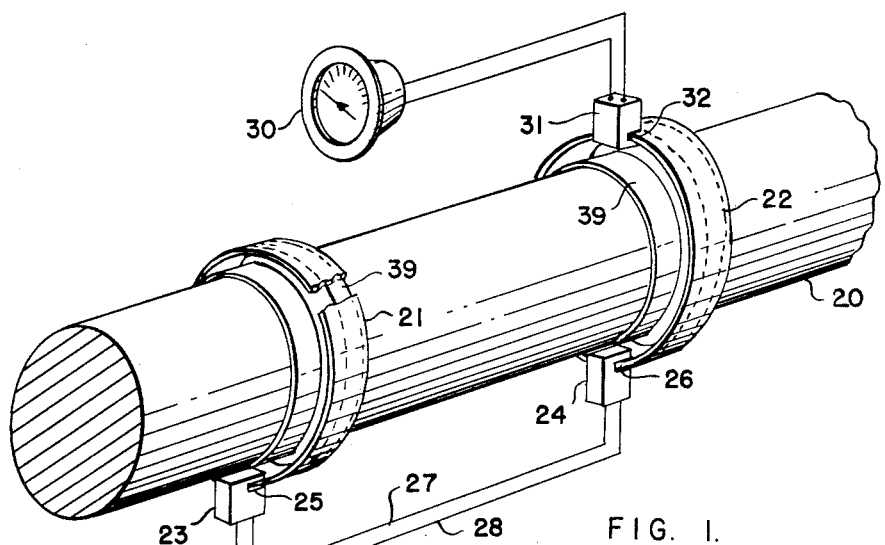
Figure 1 shows in perspective and in block outline a portion of a rotatable shaft with apparatus of the present invention for the direct and continuous reading of power applied thereto, together with schematic diagram of the connecting circuit; also shown in this figure is additional means for the independent direct and continuous reading of shaft speed.
Figure 6:
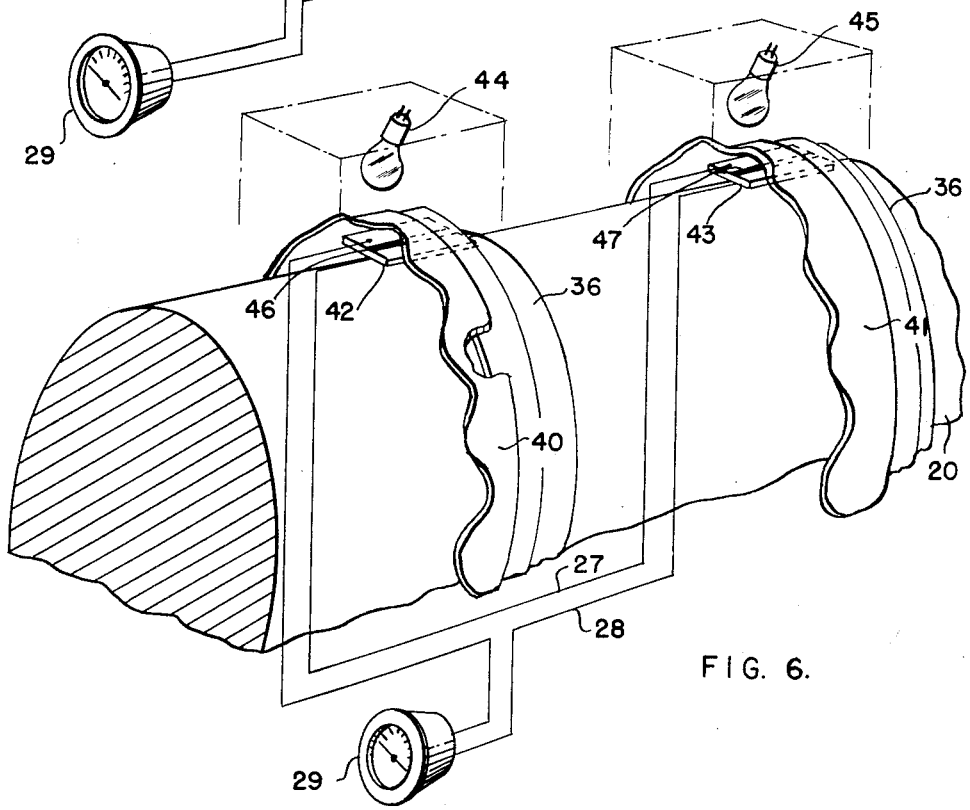
Figure 6 shows in perspective and in block outline a portion of a rotatable shaft with a modified form of the present invention for the direct and continuous reading of torque applied thereto, together with schematic diagram of the connecting circuit.
Figure 7:
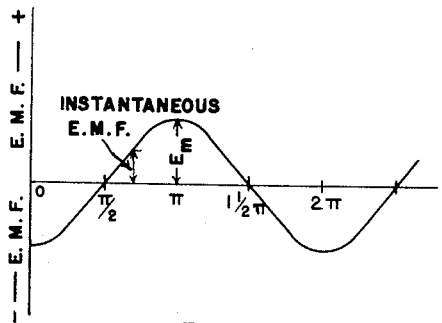
Figure 10:
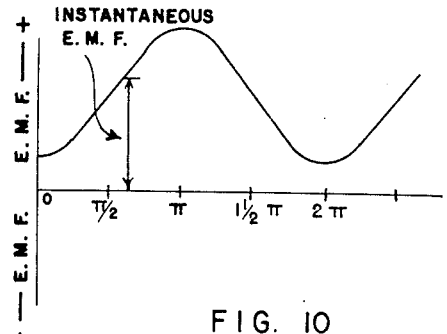
Figure 8:
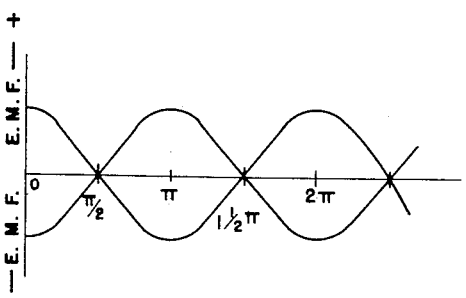
Figure 11:
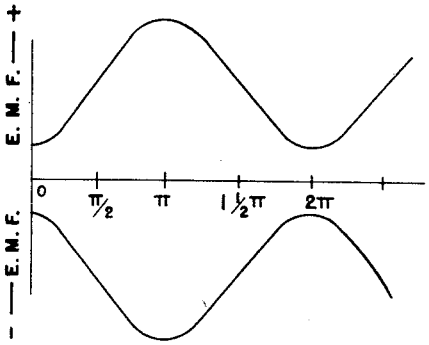
Figure 9:
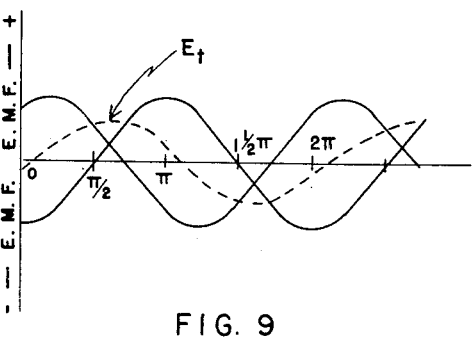
Figure 12:
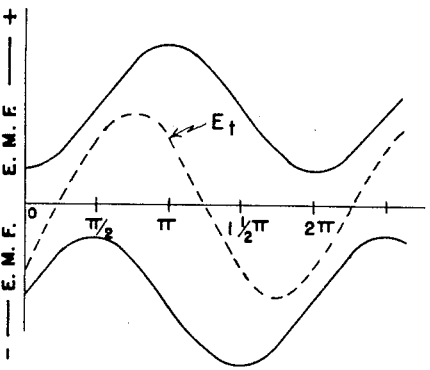

Figures 7, 8 and 9 show, graphically and respectively, the sinusoidally varying electromotive force generated in each of the pickup heads in the device shown in Figure 1, the manner in which the two identical electromotive forces oppose and cancel each other completely when the shaft is running without load, and the electromotive force resulting from the combination of these two generated electromotive forces when the shaft is running under load; and Figures 10, 11 and 12 show, graphically and respectively, the sinusoidally varying electromotive force generated in each of the photoelectric cells in the device of Figure 6, the manner in which the two identical electromotive forces oppose and cancel each other completely when the shaft is running without load, and the electromotive force resulting from the combination of these two generated electromotive forces when the shaft is running under load.

Basically, the present invention contemplates the use of an elongated element, either singly or appropriately combined with one or more similar elements, suitable for fixing circumferentially of a rotatable member, and which bears some characteristic, such as a magnetic flux density, a contour, an opaqueness or a transparency, etc., cyclically varying dimensionally of the element, such that with rotation of the rotatable member, the varying elemental characteristic, either singly or in appropriate combination, provides a response at a stationary point of observation which is proportional to a characteristic of the rotating member, such as speed, elastic twist, torque, power, etc., and which can be detected and measured or otherwise used.

Figure 2:
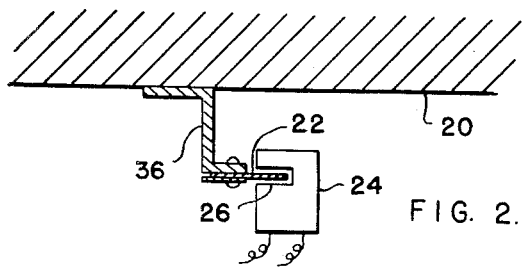
Figure 2 shows in detail a cross-section of a suitable mounting means accomplishing the fixing of the tapes of the device of Figure 1 to the shaft while permitting their passing through the stationary pickup heads.

The embodiment of Figure 1 shows the use of a pair of identical magnetic tapes for the measurement of power. The member 20, illustratively, represents a portion of a typical rotating transmission shaft connecting an appropriate power source with its load, such as, for instance, a marine propellor shaft driven by a rotary steam turbine. Magnetic tapes 21 and 22, comprising a plastic or paper base material coated with an emulsion containing finely divided magnetic powder material and a binder, such as are used in present day magnetic tape sound recorders, are fixedly attached circumferentially to shaft 20, parallel to and at an appropriate distance apart from each other. Prior to such attachment, tapes 21 and 22 are magnetized so as to retain, identically with each other, a selected number of cycles of magnetic flux density varying sinusoidally throughout the lengths of the tapes, and hence, upon assembly to shaft 20, throughout its circumference. Magnetic pickup heads 23 and 24, similarly such as are used in present day magnetic tape sound recorders, are stationarily located in association with tapes 21 and 22 respectively, so as to permit free passage through their air-gaps 25 and 26 of sufficient portions of the widths of tapes 21 and 22 during rotation of shaft 20. Figure 2 shows in detail a cross-section of a suitable means for mounting tapes 21 and 22 to the shaft 20 to accomplish this objective. Bracket 36 of Figure 2, or bracket 39, shown in Figure 1, preferably encircles shaft 20 so as to provide support throughout the circumference thereof. Pickup heads 23 and 24 are electrically connected in series with each other by wires 27 and 28 so that the electromotive forces generated in each of the pickup heads 23 and 24 by the passage of magnetized tapes 21 and 22 through air gaps 25 and 26, respectively, with rotation of the shaft, will always oppose each other. Voltmeter 29 is connected across pickup heads 23 and 24 so as to indicate any resultant electromotive force therefrom.

As the shaft 20 rotates, tapes 21 and 22 pass through pickup heads 23 and 24, generating therein identical sinusoidally varying electromotive forces. The positions of tapes 21 and 22 relative to each other on shaft 20 are adjusted so that, when the shaft is running freely without any load being applied to it, the electromotive forces generated in the pickup heads 23 and 24 will, in the electrical circuit connecting the heads, be 180° out of phase with each other, electrically speaking, and will thus completely cancel each other out, giving a zero reading on meter 29. As load is applied to the shaft, the positions of tapes 21 and 22 relative to each other change due to the resulting twist of the shaft between them, there will be a phase difference between the electromotive forces generated in the pickup heads 23 and 24 differing from 180° by an amount corresponding to this twist in the shaft, and there is a resultant electromotive force in the connecting circuit causing a corresponding indication in meter 29. That the meter can be calibrated so that such indication may be read directly as the power transmitted by the shaft will be apparent from the following analysis.

Figure 4:
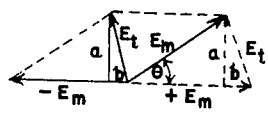
Figure 4 is a vector diagram illustrating the derivation of the relationship between the response of the apparatus of Figure 1 and the power transmitted by the shaft.

The instantaneous and effective values of the electromotive force generated in each pickup head are proportional to the rate of shaft rotation, and are identical to those in the other since the tapes are identical and are turning at the same speed. The instantaneous value of such electromotive force may be expressed:

$$e = E_m \times \sin \psi$$

where $E_m$ is the maximum value of the electromotive force generated in each head, and $\psi$ is the electrical degree of the sine curve variation. This is graphically shown in Figure 7. When the shaft is turning free the same instantaneous electromotive force generated in each pickup head occurs at the same exact moment, and in the circuit described above both combine to cancel each other out. This is graphically shown in Figure 8. However, when the shaft is turning with a load the same instantaneous electromotive force generated in each pickup head does not occur at the same moment due to the twist of the shaft but one will lead the other, as illustrated in Figure 9. The derivation, in terms of shaft speed and torque, of the resultant electromotive force $E_t$, as indicated on meter 29, and shown graphically in Figure 9, is accomplished with the aid of the vector diagram of Figure 4, as follows:

$$E_t = \sqrt{a^2 + b^2}$$
$$= \sqrt{E_m^2 \sin^2 \theta + (E_m - E_m \cos \theta)^2}$$
$$= \sqrt{E_m^2 \sin^2 \theta + E_m^2 - 2E_m^2 \cos \theta + E_m^2 \cos^2 \theta}$$
$$= E_m \sqrt{\sin^2 \theta + 1 - 2\cos \theta + \cos^2 \theta}$$
$$= E_m \sqrt{2 - 2\cos \theta}$$
$$= E_m \sqrt{2} \times \sqrt{1 - \cos \theta}$$
$$= 2E_m \sin \theta/2$$

and for phase angles under 20°:

$$E_t = a \text{ constant} \times E_m \times \theta$$

since the relationship between angles of such magnitude and their sines is substantially a linear proportion.

Since $E_m$ is directly proportional to the rate of shaft rotation, and $\theta$, the phase difference, expressed in degrees of electrical angle, is directly proportional to shaft twist and hence to the torque applied to the shaft, $E_t$ is thus proportional to the product of rate of shaft rotation and torque. Bearing in mind that power is proportional to the product of rate of shaft rotation and torque, it thus becomes apparent that the relationship between $E_t$ and power is such that meter 29, indicating values of $E_t$, can be calibrated to read values of power directly.

The great simplicity, flexibility, and adaptability of the present invention now becomes more clearly evident. One of the longstanding fundamental problems in the field of power measurement has been that the radial twist under load of a shaft such as is generally encountered has been difficult to measure accurately due to its relatively small amount. Generally speaking, this twist, which varies inversely with the rigidity modulus of the shaft and the fourth power of its diameter, may be, in marine applications, of the order of 1/10 to 1/3 of a degree per 10 feet of shaft length at full power. This consideration has previously led to the development of devices utilizing conventional and cumbersome electric generator equipment with the complication of interposing resilient couplings whose twist may be of a larger order and hence more easily measured, or of making use of extreme lengths of shaft which enhances the undesirable bending and warping effects and demands space not always available, or utilizing expensive and inflexible multipole electric generator equipment, or utilizing other complicated equipments and circuits for measurement of electromagnetic characteristics of the shaft or supplementary strain gages which may vary with twist. The present invention may, however, be readily and quickly applied in a minimum of space, and without disturbing the particular machinery installation, simply through first impressing a judiciously selected number of cycles of varying magnetic flux density upon tapes 21 and 22. Since the apparatus of the present invention in effect measures twist in terms of electrical degrees of difference in phase of the generated electromotive forces, the number of cycles impressed upon the tapes in thus a multiplying factor for the mechanical degrees of twist which readily enlarges, in effect, the degrees of twist to accurately measurable magnitudes, at the same time keeping the phase angle well below 20°, beyond which, as previously indicated, inaccuracies will occur due to nonlinearity of the significant relationships. The ease with which the number of cycles can be increased also permits accurate use of the apparatus with minimum shaft lengths allowing applications in minimum available spaces as well as practically eliminating bending and warping effects. The adaptability of the present invention to applications involving wide ranges of shaft speed and torque and hence power also follows from the foregoing.

Accurate calibration of meter 29 will, of course, depend upon the number of cycles impressed upon the tapes, the rigidity modulus and diameter of the shaft, and the spacing of the tapes on the shaft. Yet even a single calibration will do for a multiplicity of applications involving different types and sizes of shafts simply by varying the spacing of the tapes or by changing the cycling or by combinations of these adjustments.

Figure 3:
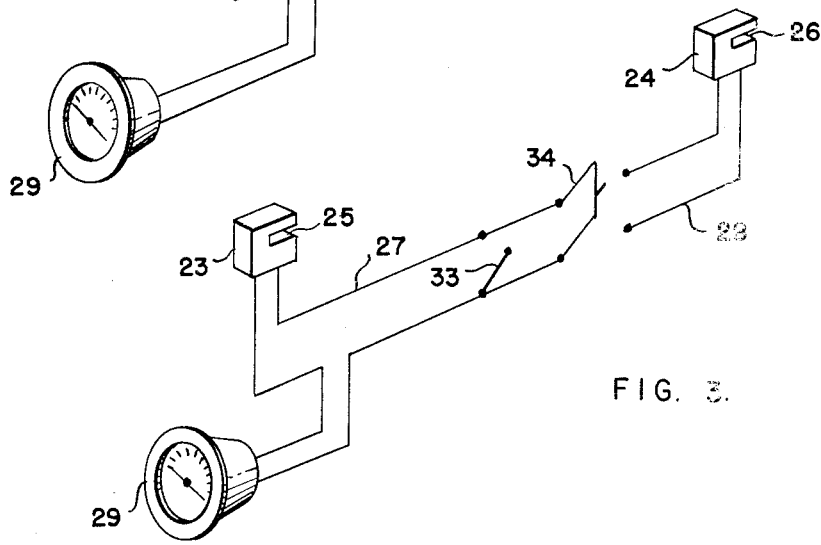
Figure 3 shows a connecting circuit alternative to that of Figure 1, in schematic diagram, whereby with suitable switches shaft speed and power can be read successively from the same meter, rather than from separate meters as shown in Figure 1.

A second meter 30 may be provided as shown in Figure 1, which with proper calibration will give direct and continuous reading of shaft speed by measuring the electromotive force generated in additional pickup head 31 associated, illustratively, with tape 22, as that tape passes through air gap 32 with rotation of the shaft. In the connection shown in Figure 1, such reading is given simultaneously with the continuous readings of power given by meter 29. A simple calculation from the readings of both meters will, of course, give torque. Alternatively, as illustrated in Figure 3, meter 29 can be utilized to obtain readings of power and shaft speed successively, by insertion in the circuit of Figure 1 connecting pickup heads 23 and 24 to each other and to meter 29, single pole single throw switch 33, and double pole single throw switch 34. Power is read as before with switch 33 open and switch 34 closed, and speed may be read by opening switch 34 and closing switch 33. Torque can thereafter be similarly calculated.

Figure 5:
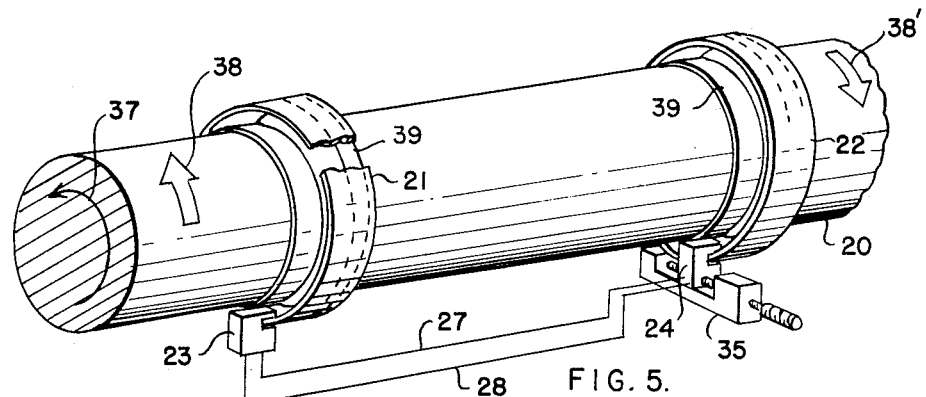
Figure 5 shows a modification of the device of Figure 1 which adds means for the measurement of torque.

The simple addition to the device of Figure 1 of micrometer 35 to pickup head 24, illustratively, as shown in Figure 5, will enable determination of torque by direct measurement, without mathematical calculation. In operation under load, shaft 20 will provide a reading on meter 29 due to twist of the shaft and resultant electromotive force through the circuit as already described. By turning micrometer 35 to move pickup head 24 in the direction of the movement of tape 22 caused by the shaft twist (or in the opposite direction, depending upon calibration of the micrometer), the electromotive forces generated in pickup heads 23 and 24 can be adjusted to the no-load condition of being 180° out of phase with each other, giving a zero reading on meter 29. The travel of pickup head 24 in making this adjustment corresponds to the shaft twist, and the reading of the micrometer, properly calibrated, will give this travel directly in terms of torque. In Figure 5, the direction of shaft rotation is indicated, illustratively, by arrow 37, and the directions of the corresponding torque couple by arrows 38 and 38'.

A modification of the Figure 1 embodiment of the present invention which will permit a continuous direct reading of torque is illustrated in Figure 6, and contemplates, in the stead of magnetic tapes 21 and 22, the use of two identical strips 40 and 41 of opaque material. These strips fixedly encircle shaft 20 parallel to and at a suitable distance apart from each other. One side of each of the strips has the contour of a sine curve of an appropriate number of cycles. Photoelectric cells 42 and 43 are stationarily associated respectively with strips 40 and 41, as are suitably shielded light sources 44 and 45, in such manner that with rotation of the shaft strips 40 and 41 pass between their respective photoelectric cells 42 and 43 and light sources 44 and 45, and close to the former. Fixing of the strips 40 and 41 to the shaft to achieve this purpose can be achieved by means similar to that illustrated in Figure 2. Both photoelectric cells are completely covered with opaque paint except for narrow strips 46 and 47, and the opaque strips 40 and 41 are so positioned with respect thereto that with rotation of shaft 20 the sensitive area 46 or 47 of each photoelectric cell that receives light from its respective light source will vary sinusoidally in correspondence with the sinusoidal side contour of each opaque strip. A corresponding identical sinusoidally varying electromotive force, similar to that illustrated graphically in Figure 10, is thus generated by each of the photoelectric cells. Electrical circuit connection of these cells 42 and 43 with each other and with voltmeter 29 is accomplished in manner similar to the connection of pickup heads 23 and 24 with each other and with voltmeter 29 in Figure 1. When the shaft is rotating freely, a zero reading is similarly given by meter 29, the electromotive forces generated by the cells 40 and 41 when connected as described being 180° out of phase with each other and completely cancelling each other out, in manner as illustrated graphically in Figure 11. With the shaft under load, however, there is an electromotive force in the circuit resulting from the combination of the electromotive forces of the cells 40 and 41 which are no longer exactly 180° out of phase with each other because of shaft twist, and a consequent indication in meter 29. The combination of these electromotive forces to give this resultant occurs in manner similar to that illustrated in Figure 12. As previously derived, the resultant electromotive force $E_t = 2E_m \sin \theta/2$, or $=$ a constant $\times E_m \times \theta$. As before, the phase difference $\theta$, expressed in degrees of electrical angle, is directly proportional to the torque applied to shaft 20, but now $E_m$, instead of being proportional to shaft speed as in Figure 1, is a constant, since it depends upon the maximum area of the photoelectric cell sensitive strips exposed to the light rather than upon the rate at which it varies. Thus the phase difference $\theta$ is proportional to torque alone, and $E_t$ is consequently proportional to torque. Proper calibration of meter 29 will permit direct continuous readings of torque therefrom, accordingly. The same considerations respecting selection of the number of cycles, the spacing of the opaque strips 40 and 41, etc., as applied in the magnetic tape embodiment, apply here.

While the embodiments of Figures 1 and 6 contemplate sinusoidal variations in the characteristics of magnetic flux density and side contour, respectively, with the derivation of the relationships corresponding thereto, it should be understood that the invention is not limited thereto, since any number of different types of repetitive, recurring, or cyclical variations of the various characteristics which may be utilized will work, and the invention contemplates all of these. As also indicated, the invention further contemplates the use of any of a wide variety of characteristics other than magnetic flux densities or side contours, and including transparencies or opaqueness varying in degree longitudinally, transversely, or otherwise, impressed grooves varying transversely or in depth or otherwise, etc., which may be imparted to various materials, in the form of tapes, strips, wires, etc., and, of course, contemplates the use of the various types of devices sensitive to the particular characteristic or characteristics selected, in addition to magnetic pickup heads and photoelectric cells, including photoelectric tubes, styli corresponding in nature to phonograph pickups, etc. The invention further contemplates its adaptability for response to a variety of characteristics of one or more rotating members, severally or in combination, and application of the response not only to galvanometer type meters, but also to a wide variety of other indicating or recording instruments, such as continuous graphic recorders, oscilloscopes, etc., and to other devices responsive in general to the various characteristics of the rotating member or members involved, and to conditions of unbalance therein, which devices may be utilized to accomplish a variety of purposes. Thus the invention is not limited to the embodiments described and illustrated, or to the modifications suggested. Many other modifications and variations, adaptations and uses thereof will readily occur, and it must be understood that all such modifications, etc., are equally within the contemplation and scope of the invention and the appended claims.

Having thus described my invention, I claim:

1. An instrument providing a direct and continuous reading of the power transmitted by a rotating shaft, comprising a pair of identical magnetic tapes fixedly encircling the shaft parallel to and in spaced relationship with each other and having impressed therein identical magnetic flux densities sinusoidally varying in intensity longitudinally thereof, a magnetic pickup head stationarily associated with each of said tapes containing an air gap through which at least a portion of its associated tape passes with rotation of the shaft, an indicator, and a circuit interconnecting said pickup heads and said indicator.

2. The instrument of claim 1 including an additional magnetic pickup head stationarily associated with one of said magnetic tapes and an additional indicator connected therewith and calibrated to directly and continuously indicate rate of shaft rotation.

3. The instrument of claim 1 having interposed in the circuit interconnecting the pickup heads and the indicator switching means permitting the successive indications on said indicator of power transmitted by the rotating shaft and rate of shaft rotation.

4. The instrument of claim 1 having micrometer means and one of said magnetic pickup heads so associated therewith as to be measurably movable by said micrometer means to provide an indication of torque.

5. An instrument providing a direct and continuous indication of the speed of a rotating member comprising an elongated magnetic tape fixedly encircling the member and having impressed therein a magnetic flux density sinusoidally varying in intensity longitudinally thereof, a stationary magnetic pickup head linked magnetically with said tape so as to produce a continuous electric potential proportional to rotational speed of the member, and a galvanometer connected to said pickup head having a scale calibrated to read in units of rotational speed.

References Cited in the file of this patent
UNITED STATES PATENTS

| | | |
|---|---|---|
| 2,193,079 | Schrader | Mar. 12, 1940 |
| 2,277,285 | Woodling | Mar. 24, 1942 |
| 2,586,540 | Holden | Feb. 19, 1952 |
| 2,640,352 | Ellison | June 2, 1953 |
| 2,675,700 | Van Degrift | Apr. 20, 1954 |
| 2,782,626 | Jochum | Feb. 26, 1957 |

FOREIGN PATENTS

| | | |
|---|---|---|
| 600,980 | Great Britain | Apr. 23, 1948 |